US012072088B1

(12) United States Patent
Wang et al.

(10) Patent No.: US 12,072,088 B1
(45) Date of Patent: Aug. 27, 2024

(54) SCENE LAMP

(71) Applicants: ETI SOLID STATE LIGHTING INC, Wheeling, IL (US); CRAWFORD GLOBAL LIMITED, Hong Kong (CN)

(72) Inventors: Donglei Wang, Guangdong (CN); Jibin Cheng, Guangdong (CN)

(73) Assignees: ETI SOLID STATE LIGHTING INC, Wheeling (IL); CRAWFORD GLOBAL LIMITED, Hong Kong (CN)

( * ) Notice: Subject to any disclaimer, the term of this patent is extended or adjusted under 35 U.S.C. 154(b) by 0 days.

(21) Appl. No.: 18/225,176

(22) Filed: Jul. 24, 2023

(30) Foreign Application Priority Data

Jun. 30, 2023 (CN) ......................... 202321711434.3

(51) Int. Cl.
*F21V 3/04* (2018.01)
*F21V 7/10* (2006.01)

(52) U.S. Cl.
CPC ................ *F21V 3/049* (2013.01); *F21V 7/10* (2013.01)

(58) Field of Classification Search
CPC .................................. F21V 3/049; F21V 7/10
See application file for complete search history.

(56) References Cited

U.S. PATENT DOCUMENTS

| | | | | | |
|---|---|---|---|---|---|
| 1,348,957 | A * | 8/1920 | Pope | G09G 3/004 | 40/716 |
| 3,666,936 | A * | 5/1972 | Webster, Jr. | G09F 19/00 | 362/812 |
| 10,088,131 | B2 * | 10/2018 | Su | G09F 13/005 | |
| 2011/0216521 | A1 * | 9/2011 | Howe | B32B 38/00 | 362/351 |

* cited by examiner

*Primary Examiner* — Thomas M Sember
(74) *Attorney, Agent, or Firm* — Samson G. Yu

(57) ABSTRACT

The present disclosure provides a scene lamp. The scene lamp includes a base plate, a light output cover, and at least one group of light sources, where the light sources are arranged on the base plate, and the light output cover is connected to the base plate; the light output cover has a main illumination region and a scene light region, and the scene light region is provided with an image layer; a height difference is formed between the scene light region and the main illumination region in a main light output direction of the main illumination region; and/or, the base plate includes a side wall, and a height difference is formed between the scene light region and the side wall in a main light output direction of the main illumination region. The scene lamp of the present disclosure is simple in structure, low in manufacturing cost.

19 Claims, 5 Drawing Sheets

SCENE LAMP

CROSS-REFERENCE TO RELATED APPLICATION

The disclosure claims priority to Chinese Patent Application No. 202321711434.3, filed to the China National Intellectual Property Administration on Jun. 30, 2023 and entitled "Scene Lamp" which are incorporated herein by reference in its entirety.

TECHNICAL FIELD

The present disclosure relates to the technical field of illumination lamps, and particularly relates to a scene lamp.

BACKGROUND

In addition to an illumination effect, scene lamps may provide a visual effect of a virtual scene and create a comfortable, healthy and natural light environment, thereby playing an active role of pleasing people.

A type of existing scene lamp is provided with a scene drawing unit on a light output surface of a light output cover. The scene drawing unit completely covers the light output surface of the light output cover, so as to ensure a visual scene effect. But without a special illumination light output region, an illumination effect is still far from satisfactory.

In order to ensure an illumination effect and a visual scene effect, another type of existing scene lamp is provided with at least two light output covers spaced apart from each other. One of the light output covers outputs light for special illumination, and the other light output cover outputs light for a visual effect of a virtual scene. However, this type of existing scene lamp is complicated in structure and high in manufacturing cost due to at least two light output covers spaced apart from each other and two groups of light output systems.

SUMMARY

Some embodiments of the present disclosure provide a scene lamp that is simple in structure, low in manufacturing cost, and desirable in illumination effect and visual scene effect, such that pleasing experience of using the scene lamp by users is improved.

In order to achieve the main objective of the present disclosure, the present disclosure provides a scene lamp. The scene lamp includes a base plate, a light output cover, and at least one group of light sources. The light sources are arranged on the base plate. The light output cover is connected to the base plate. The light output cover has a main illumination region and a scene light region. The scene light region is provided with an image layer. A height difference is formed between the scene light region and the main illumination region in a main light output direction of the main illumination region; and/or, the base plate includes a side wall, and a height difference is formed between the scene light region and the side wall in a main light output direction of the main illumination region.

It may be seen from the above embodiment that light from the light sources of the scene lamp of the present disclosure is led out of the base plate through the light output cover, where one part of the light is led out of the base plate through the main illumination region of the light output cover so as to be used for illumination, and the other part of the light is led out of the base plate through the scene light region of the light output cover. The scene light region is provided with the image layer, such that a visual effect of a virtual scene is achieved. It may be seen that one light output cover of the scene lamp of the present disclosure is provided with the main special illumination region and the special scene light region, such that output illumination light and output scene light are separated, and the special scene light region only occupies a local region of the light output cover. In this way, a visual scene effect is improved while an illumination effect is improved, and further both the illumination effect and the visual scene effect are better. Moreover, the scene lamp of the present disclosure only needs to be provided with one light output cover, and light output from the light sources is divided into two parts through the main illumination region and the scene light region of the light output cover, which are output illumination light and output scene light. In this way, multi-region light output is achieved, further the illumination effect and the visual scene effect are improved, a structure of the scene lamp is simple, and the product manufacturing cost is reduced. In addition, the height difference is formed between the scene light region having the image layer and the main illumination region in the main light output direction of the main illumination region, and/or the height difference is formed between the scene light region having the image layer and the side wall of the base plate in the main light output direction of the main illumination region. In this way, the visual scene effect of the image layer may be more three-dimensional and better, and further the pleasing experience of using the scene lamp by users is improved.

In an embodiment mode, the main illumination region is configured around a periphery of the scene light region; or the scene light region is configured around a periphery of the main illumination region; or the main illumination region is located at one side of the scene light region in a direction perpendicular to the main light output direction of the main illumination region.

In an embodiment mode, the height difference is formed between the scene light region and the side wall in the main light output direction of the main illumination region, the light output cover is a light transmitting cover integrally formed, the light output cover is a planar cover body, and the main illumination region and the scene light region are configured in different regions of the same plane of the planar cover body separately; or the height difference is formed between the scene light region and the main illumination region in the main light output direction of the main illumination region, the light output cover is a light transmitting cover integrally formed, the light output cover is configured with a first region and a second region having a height difference therebetween in the main light output direction of the main illumination region, the main illumination region is completely or partially configured in the first region, and the scene light region is completely or partially configured in the second region.

In an embodiment mode, the height difference is formed between the scene light region and the main illumination region in the main light output direction of the main illumination region, the light output cover further has a joint region, and the main illumination region and the scene light region are connected to each other by means of the joint region.

In an embodiment mode, in the main light output direction of the main illumination region, the scene light region is configured closer to a mounting wall of the base plate than the main illumination region; or in the main light output direction of the main illumination region, the main illumination region is configured closer to a mounting wall of the base plate than the scene light region.

In an embodiment mode, the image layer is arranged on an outer surface of the scene light region away from the light sources, and an outer surface of the image layer away from the scene light region is provided with a transparent plate.

In an embodiment mode, the transparent plate is attached to the outer surface of the image layer away from the scene light region, or a spacer gap is formed between the transparent plate and the outer surface of the image layer away from the scene light region; and/or, the transparent plate is arranged in parallel with the image layer.

In an embodiment mode, the light output cover is arranged opposite the light sources in the main light output direction of the main illumination region, and a main light output direction of the light sources is the main light output direction of the main illumination region; or the light sources are arranged on a peripheral side of the light output cover, and a main light output direction of the light sources is perpendicular to the main light output direction of the main illumination region.

In an embodiment mode, the image layer is attached to the scene light region through spraying or printing; or the image layer is a light transmitting film having an image, and the light transmitting film is bonded to the scene light region; or the image layer is a light transmitting membrane having an image, and the light transmitting membrane is arranged on the scene light region.

In an embodiment mode, the image layer is arranged on an outer surface of the scene light region away from the light sources, the scene light region is concavely configured relative to the main illumination region in the main light output direction of the main illumination region, and the image layer extends to a concave joint wall connected between the scene light region and the main illumination region.

In an embodiment mode, the scene lamp further includes a light shielding plate, and the light shielding plate separates the light output cover into the main illumination region and the scene light region, so as to at least partially separate light output from the main illumination region from light output from the scene light region.

In an embodiment mode, the light shielding plate is arranged on an outer surface of the light output cover away from the light sources, and the image layer is arranged on the outer surface of the scene light region away from the light sources.

In an embodiment mode, the scene light region is concavely configured relative to the main illumination region in the main light output direction of the main illumination region, and the light shielding plate is arranged on the concave joint wall connected between the scene light region and the main illumination region.

In an embodiment mode, the light shielding plate is concavely provided with a first concave part facing the concave joint wall, the concave joint wall is concavely provided with a second concave part adapted to the first concave part, and the first concave part is embedded in the second concave part.

In an embodiment mode, the light shielding plate is an annular plate, the light shielding plate extends in the main light output direction of the main illumination region, and the image layer is located in an inner ring of the light shielding plate.

In an embodiment mode, the height difference is formed between the scene light region and the side wall in the main light output direction of the main illumination region, the light output cover is the light transmitting cover integrally formed, the light output cover is the planar cover body, and the main illumination region and the scene light region are configured in different regions of the same plane of the planar cover body separately; and the light shielding plate is an annular plate and is convexly arranged on the outer surface of the light output cover in the main light output direction of the main illumination region, one end of the light shielding plate abuts against the main illumination region and/or the scene light region, and the image layer or the main illumination region is located in an inner ring of the light shielding plate.

In an embodiment mode, the light output cover is arranged opposite the light sources in the main light output direction of the main illumination region, and the light shielding plate is located between the light output cover and the light sources in the main light output direction of the main illumination region.

In an embodiment mode, the scene light region is convexly configured relative to the main illumination region in the main light output direction of the main illumination region, and one end of the light shielding plate in the main light output direction of the main illumination region extends to a convex joint wall connected between the scene light region and the main illumination region.

In an embodiment mode, two groups of the light sources are provided, one group of the light sources are arranged opposite the main illumination region in the main light output direction of the main illumination region, and the other group of the light sources are arranged opposite the scene light region in the main light output direction of the main illumination region; or one group of the light sources are provided, and the one group of the light sources cover and irradiate the main illumination region and the scene light region.

In an embodiment mode, the image layer is arranged on the outer surface of the scene light region away from the light sources, a first light blocking plate is arranged at a joint between the main illumination region and the scene light region, a first end of the first light blocking plate extends to and covers an outer surface of an edge of the image layer adjacent to the main illumination region, and a second end of the first light blocking plate extends to and covers an outer surface of an edge of the main illumination region adjacent to the image layer; and/or, the scene light region is configured around the periphery of the main illumination region, an outer edge of the scene light region away from the main illumination region is provided with a second light blocking plate, a first end of the second light blocking plate extends to and covers an outer surface of an outer edge of the image layer away from the main illumination region, and a second end of the second light blocking plate extends to and covers an outer surface of a non-scene light region of the light output cover.

The present disclosure will be further described below with reference to accompanying drawings and embodiments.

DETAILED DESCRIPTION OF THE EMBODIMENTS

First Embodiment of Scene Lamp

Figure 1:
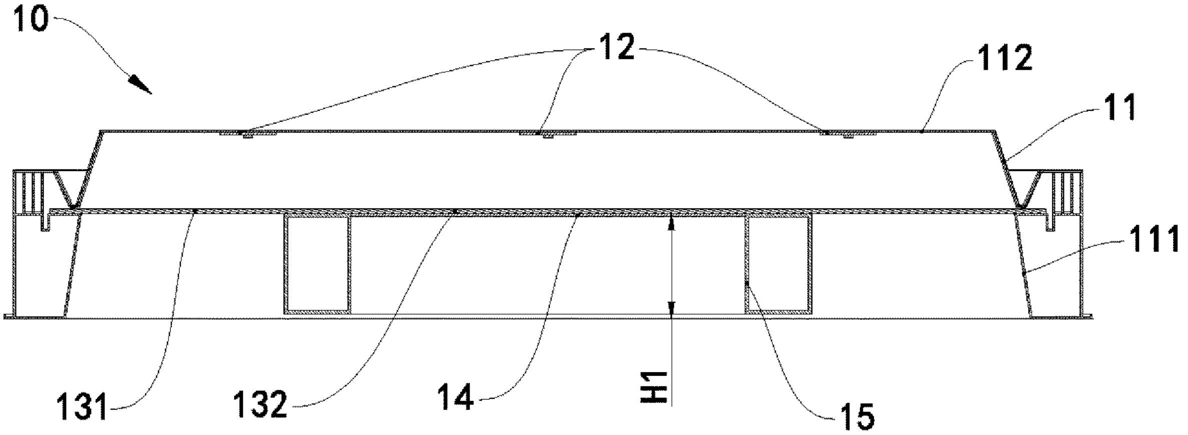
FIG. 1 is a section view of a first embodiment of a scene lamp of the present disclosure.
Figure 2:
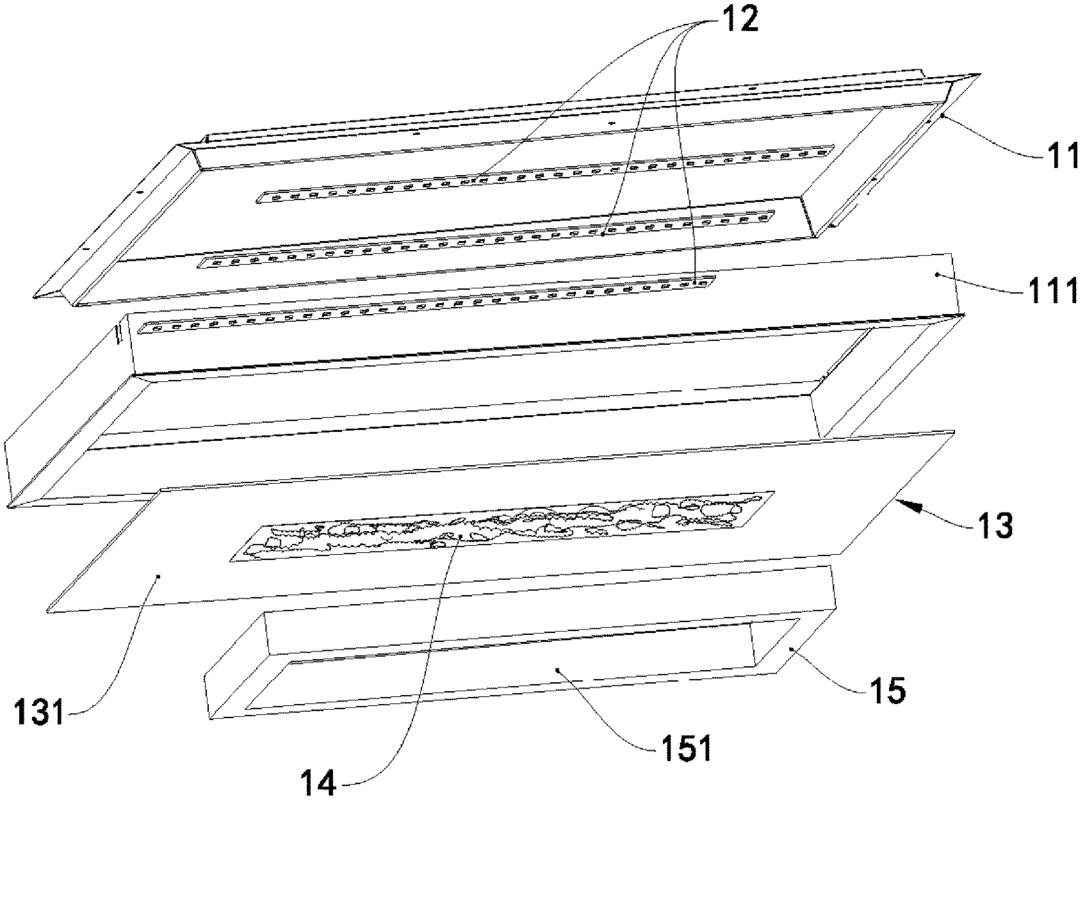
FIG. 2 is an exploded view of a structure of a first embodiment of a scene lamp of the present disclosure.

With reference to FIGS. 1 and 2, in the embodiment, a scene lamp 10 includes a base plate 11, a light output cover 13, and at least one group of light sources 12. The light sources 12 are arranged on the base plate 11. The light output cover 13 is connected to the base plate 11. The light output cover 13 is one or a combination of several of a diffusion cover, a light guide plate, a light transmitting cover, and a semi-light-transmitting cover. In the embodiment, the light output cover 13 has a main illumination region 131 and a scene light region 132, and the scene light region 132 is provided with an image layer 14. Moreover, in the embodiment, the base plate 11 includes a side wall 111, and a height difference H1 is formed between the scene light region 132 and the side wall 111 in a main light output direction of the main illumination region 131. Specifically, in the embodiment, the image layer 14 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 12 of the scene lamp 10 is led out of the base plate 11 through the light output cover 13, where one part of the light is led out of the base plate 11 through the main illumination region 131 of the light output cover 13 so as to be used for illumination, and the other part of the light is led out of the base plate 11 through the scene light region 132 of the light output cover 13. The scene light region 132 is provided with the image layer 14, such that a visual effect of a virtual scene is achieved. It may be seen that in the embodiment, one light output cover 13 of the scene lamp 10 is provided with the main special illumination region 131 and the special scene light region 132, such that output illumination light and output scene light are separated, and the special scene light region 132 only occupies a local region of the light output cover 13. In this way, a visual scene effect is improved while an illumination effect is improved, and further both the illumination effect and the visual scene effect are better. Moreover, in the embodiment, the scene lamp 10 only needs to be provided with one light output cover 13, and light output from the light sources 12 is divided into two parts through the main illumination region 131 and the scene light region 132 of the light output cover 13, which are output illumination light and output scene light. In this way, multi-region light output is achieved, further the illumination effect and the visual scene effect are improved, a structure of the scene lamp 10 is simple, and the product manufacturing cost is reduced. In addition, in the embodiment, the height difference H1 is formed between the scene light region 132 having the image layer 14 and the side wall 111 of the base plate 11 in the main light output direction of the main illumination region 131. In this way, the visual scene effect of the image layer 14 is more three-dimensional and better, and further the pleasing experience of using the scene lamp 10 by users is improved.

Specifically, in the embodiment, the light output cover 13 is a light transmitting cover integrally formed, the light output cover 13 is a planar cover body, and the main illumination region 131 and the scene light region 132 are configured in different regions of the same plane of the planar cover body separately. Further, in the embodiment, the image layer 14 is arranged on an outer surface of the scene light region 132 away from the light sources 12.

In the embodiment, the main illumination region 131 of the light output cover 13 is configured around a periphery of the scene light region 132. That is, the main illumination region 131 of the light output cover 13 is configured around a periphery of the image layer 14. Preferably, in the embodiment, the image layer 14 is located in a center of the light output cover 13. Alternatively, the main illumination region 131 of the light output cover 13 is located at one side of the scene light region 132 in a direction perpendicular to the main light output direction of the main illumination region 131. When the main light output direction of the main illumination region 131 is in a vertical direction, the direction perpendicular to the main light output direction of the main illumination region 131 is a horizontal direction. In this way, the main illumination region 131 of the light output cover 13 is located at one side of the scene light region 132 in the horizontal direction. That is, the main illumination region 131 of the light output cover 13 is located at a left or right or front or rear side of the scene light region 132 in the horizontal direction. Alternatively, the main illumination region 131 and the scene light region 132 are configured in a left-middle-right structure in the horizontal direction. Alternatively, the main illumination region 131 and the scene light region 132 are configured in an upper-middle-lower structure in the horizontal direction. Certainly, the main illumination regions 131 may also be located at two sides of the scene light region 132 in the horizontal direction. That is, the main illumination regions 131 of the light output cover 13 are located at left and right sides or front and rear sides of the scene light region 132 in the horizontal direction. Alternatively, the scene light region 132 is located at two sides of the main illumination region 131 in the horizontal direction.

Moreover, in the embodiment, the light output cover 13 is arranged opposite the light sources 12 in the main light output direction of the main illumination region 131, and a main light output direction of the light sources 12 is the main light output direction of the main illumination region 131. That is, the scene lamp 10 of the embodiment emits light vertically towards the light output cover 13. That is, in the embodiment, the main light output direction of the main illumination region 131 is a light output direction that is vertically downward. Actually, the light output cover 13 of the scene lamp 10 may have a different auxiliary light output direction, such as a lateral light output direction in the horizontal direction or a vertically upward light output direction.

In addition, in the embodiment, the scene lamp 10 is in a shape of a square, a circle, an ellipse, or a combination thereof. That is, the base plate 11 of the scene lamp 10 is in a shape of a square, a circle, an ellipse, or a combination thereof. By means of a mounting wall 112 of the base plate 11, the scene lamp 10 of the embodiment is mounted in a ceiling-mounted manner, an embedded manner, a wall-mounted manner, etc. In the embodiment, the mounting wall 112 of the base plate 11 is arranged opposite the light output cover 13 in the main light output direction of the main illumination region 131.

In addition, in the embodiment, the image layer 14 is attached to an outer surface of the scene light region 132 through spraying or printing; alternatively, the image layer 14 is a light transmitting film having an image, and the light transmitting film is bonded to an outer surface of the scene light region 132; and alternatively, the image layer 14 is a light transmitting membrane having an image, and the light transmitting membrane is arranged on an outer surface of the scene light region 132. Methods of the printing may include, but are not limited to, screen printing, pad printing, laser printing, ultraviolet (UV) printing, etc.

In the embodiment, the light output cover 13 is a planar structure integrally formed. That is, in the embodiment, no height difference is formed between the main illumination region 131 and the scene light region 132 of the light output cover 13 in the main light output direction of the main illumination region 131, such that the main illumination region 131 and the scene light region 132 are configured in different regions of the same plane of the light output cover 13 separately. The side wall 111 of the base plate 11 is arranged to protrude from the scene light region 132 of the light output cover 13 in the main light output direction of the main illumination region 131, such that the height difference H1 is formed between the scene light region 132 of the light output cover 13 and the side wall 111 of the base plate 11 in the main light output direction of the main illumination region 131. In this way, the visual scene effect of the image layer 14 is more three-dimensional and better, and further the pleasing experience of using the scene lamp 10 by users is improved.

In order to reduce cross-fading influence between output illumination light and output scene light and further improve an illumination effect and a visual scene effect, in the embodiment, the scene lamp 10 further includes a light shielding plate 15, and the light shielding plate 15 separates the light output cover 13 into the main illumination region 131 and the scene light region 132, so as to at least partially separate light output from the main illumination region 131 from light output from the scene light region 132. Specifically, in the embodiment, the light shielding plate 15 is arranged on an outer surface of the light output cover 13 away from the light sources 12, and the image layer 14 is arranged on an outer surface of the scene light region 132 away from the light sources 12. Further, in the embodiment, the light shielding plate 15 is an annular plate, the annular plate is one of a circular ring plate, a polygonal ring plate, a rectangular ring plate, etc., and the light shielding plate 15 extends in the main light output direction of the main illumination region 131. The light shielding plate 15 is convexly arranged on the outer surface of the light output cover 13 in the main light output direction of the main illumination region 131, one end of the light shielding plate 15 abuts against the main illumination region 131 and/or the scene light region 132, and the image layer 14 or the main illumination region 131 is located in an inner ring 151 of the light shielding plate 15. Specifically, in the embodiment, the image layer 14 is located in the inner ring 151 of the light shielding plate 15. That is, the light shielding plate 15 separates the outer surface of the light output cover 13 away from the light sources 12 into the main illumination region 131 and the scene light region 132, and the image layer 14 is located in the inner ring 151 of the light shielding plate 15 and is arranged on the outer surface of the scene light region 132. The light shielding plate 15 has a light shielding function, and may separate the main illumination region 131 and the scene light region 132 of the light output cover 13, so as to reduce the cross-fading influence between the output illumination light and the output scene light, such that the illumination effect of the main illumination region 131 and the visual scene effect of the scene light region 132 are further improved. Meanwhile, in the embodiment, the light shielding plate 15 is convexly arranged on the outer surface of the light output cover 13 away from the light sources 12, and the image layer 14 is concavely located in the inner ring 151 of the light shielding plate 15 and arranged on the scene light region 132. In this way, the output scene light may achieve a skylight effect, further a visual effect of the output scene light is enhanced, the visual scene effect is better, and further the pleasing experience of using the scene lamp 10 by users is improved. The light shielding plate 15 is an injection molded member or a combination of an aluminum extruded section or an extrusion molded member, and is preferably made of light-proof materials. The light shielding plate is structurally connected to the light output cover 13 through clamping or screwing so as to be mounted conveniently, and the image layer 14 is fixed.

Further, in the embodiment, one group of light sources 12 are provided, and the one group of light sources 12 cover the main illumination region 131 and the scene light region 132, such that a structure of the scene lamp 10 is simpler, and further the product manufacturing cost is reduced. Alternatively, in the embodiment, two groups of light sources 12 are provided, where one group of light sources 12 are arranged opposite the main illumination region 131 in the main light output direction of the main illumination region 131, and the other group of light sources 12 are arranged opposite the scene light region 132 in the main light output direction of the main illumination region 131. In this way, light output is managed in a multi-region manner. That is, the main illumination region 131 and the scene light region 132 may output light independently or simultaneously, such that a user may adjust a light output region advantageously according to actual needs.

Second Embodiment of Scene Lamp

Figure 3:
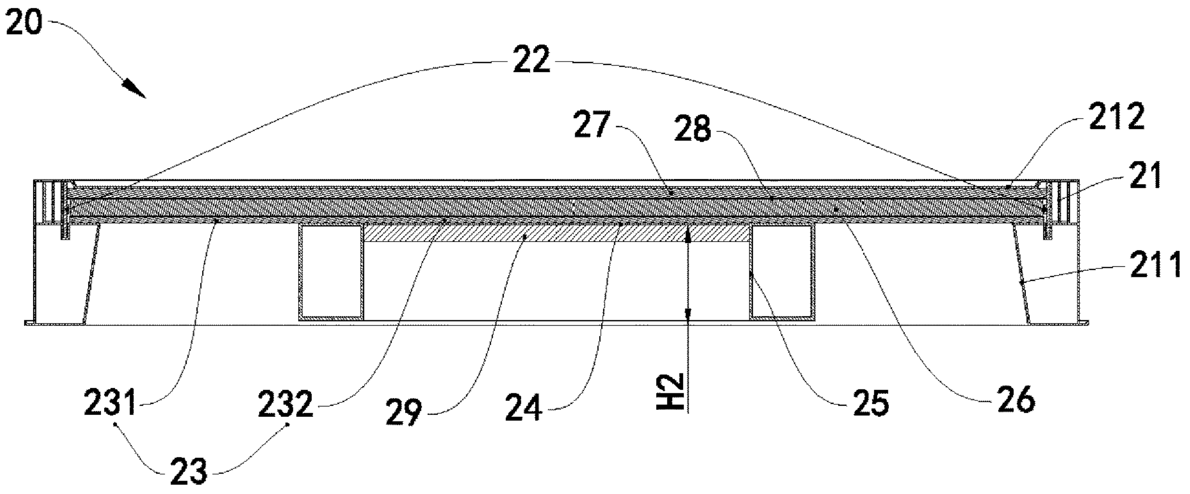
FIG. 3 is a section view of a second embodiment of a scene lamp of the present disclosure.
Figure 4:
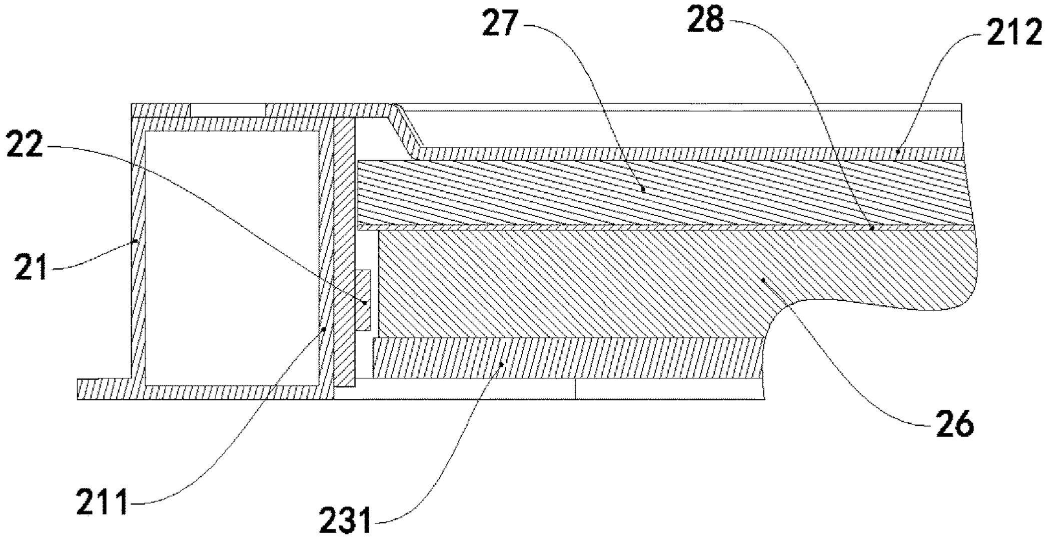
FIG. 4 is a local section view of a second embodiment of a scene lamp of the present disclosure.

With reference to FIGS. 3 and 4, in the embodiment, a scene lamp 20 includes a base plate 21, a light output cover 23, and at least one group of light sources 22. The light sources 22 are arranged on the base plate 21. The light output cover 23 is connected to the base plate 21. The light output cover 23 is one or a combination of several of a diffusion cover, a light guide plate, a light transmitting cover, and a semi-light-transmitting cover. In the embodiment, the light output cover 23 has a main illumination region 231 and a scene light region 232, and the scene light region 232 is provided with an image layer 24. Moreover, in the embodiment, the base plate 21 includes a side wall 211, and a height difference H2 is formed between the scene light region 232 and the side wall 211 in a main light output direction of the main illumination region 231. Specifically, in the embodiment, the image layer 24 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 22 of the scene lamp 20 is led out of the base plate 21 through the light output cover 23, where one part of the light is led out of the base plate 21 through the main illumination region 231 of the light output cover 23 so as to be used for illumination, and the other part of the light is led out of the base plate 21 through the scene light region 232 of the light output cover 23. The scene light region 232 is provided with the image layer 24, such that a visual effect of a virtual scene is achieved. It may be seen that in the embodiment, one light output cover 23 of the scene lamp 20 is provided with the main special illumination region 231 and the special scene light region 232, such that output illumination light and output scene light are separated, and the special scene light region 232 only occupies a local region of the light output cover 23. In this way, a visual scene effect is improved while an illumination effect is improved, and further both the illumination effect and the visual scene effect are better. Moreover, in the embodiment, the scene lamp 20 only needs to be provided with one light output cover 23, and light output from one group of light sources 22 is divided into two parts through the main illumination region 231 and the scene light region 232 of the light output cover 23, which are output illumination light and output scene light. In this way, multi-region light output is achieved, further the illumination effect and the visual scene effect are improved, a structure of the scene lamp 20 is simple, and the product manufacturing cost is reduced. In addition, in the embodiment, the height difference H2 is formed between the scene light region 232 having the image layer 24 and the side wall 211 of the base plate 21 in the main light output direction of the main illumination region 231. In this way, the visual scene effect of the image layer 24 is more three-dimensional and better, and further the pleasing experience of using the scene lamp 20 by users is improved.

Specifically, in the embodiment, the light output cover 23 is a light transmitting cover integrally formed, the light output cover 23 is a planar cover body, and the main illumination region 231 and the scene light region 232 are configured in different regions of the same plane of the planar cover body separately. Further, in the embodiment, the image layer 24 is arranged on an outer surface of the scene light region 232 away from the light sources 22.

In the embodiment, the main illumination region 231 of the light output cover 23 is configured around a periphery of the scene light region 232. That is, the main illumination region 231 of the light output cover 23 is configured around a periphery of the image layer 24. Preferably, in the embodiment, the image layer 24 is located in a center of the light output cover 23.

Moreover, in the embodiment, the light sources 22 are arranged on a peripheral side of the light output cover 23. That is, a main light output direction of the light sources 22 is perpendicular to the main light output direction of the main illumination region 231. Specifically, in the embodiment, the light output cover 23 is a light diffusion cover. In addition, in the embodiment, the scene lamp 20 further includes a light guide plate 26, and the light guide plate 26 is arranged on an inner surface of the light output cover 23 away from the image layer 24, such that the light sources 22 are arranged on a peripheral side of the light guide plate 26, and the light guide plate 26 guides light emitted from the light sources 22 to the light output cover 23. That is, in the embodiment, the light sources 22 emit light from the peripheral side of the light guide plate 26, and the light is guided to the light output cover 23 through the light guide plate 26 and then led out of the base plate 21. Further, in the embodiment, the scene lamp 20 further includes reflective paper 28 and expandable polyethylene 27. The expandable polyethylene 27 is arranged on a side surface of the light guide plate 26 away from the light output cover 23, and the reflective paper 28 is arranged between the light guide plate 26 and the expandable polyethylene 27, such that the situation that an intensity of light output from a side surface of the light sources 22 is weakened because the side surface of the light guide plate 26 away from the light output cover 23 outputs light diffusively when the light passes the light guide plate 26 is avoided. In this way, the reflective paper 28 and the expandable polyethylene 27 are arranged to completely guide the light output from the side surface of the light sources 22 to the light output cover 23 and then out of the base plate 21, so as to ensure an intensity of the light guided out of the base plate 21.

In addition, in the embodiment, the scene lamp 20 is in a shape of a square, a circle, an ellipse, or a combination thereof. That is, the base plate 21 of the scene lamp 20 is in a shape of a square, a circle, an ellipse, or a combination thereof. By means of a mounting wall 212 of the base plate 21, the scene lamp 20 of the embodiment is mounted in a ceiling-mounted manner, an embedded manner, a wall-mounted manner, etc. In the embodiment, the mounting wall 212 of the base plate 21 is located at one side of the expandable polyethylene 27 away from the reflective paper 28 in the main light output direction of the main illumination region 231.

In addition, in the embodiment, the image layer 24 is attached to an outer surface of the scene light region 232 through spraying or printing; alternatively, the image layer 24 is a light transmitting film having an image, and the light transmitting film is bonded to an outer surface of the scene light region 232; and alternatively, the image layer 24 is a light transmitting membrane having an image, and the light transmitting membrane is arranged on an outer surface of the scene light region 232. Methods of the printing may include, but are not limited to, screen printing, pad printing, laser printing, UV printing, etc.

In the embodiment, the light output cover 23 is a planar structure integrally formed. That is, in the embodiment, no height difference is formed between the main illumination region 231 and the scene light region 232 of the light output cover 23 in the main light output direction of the main illumination region 231, such that the main illumination region 231 and the scene light region 232 are configured in different regions of the same plane of the light output cover 23 separately. The side wall 211 of the base plate 21 is arranged to protrude from the scene light region 232 of the light output cover 23 in the main light output direction of the main illumination region 231, such that the height difference H2 is formed between the scene light region 232 of the light output cover 23 and the side wall 211 of the base plate 21 in the main light output direction of the main illumination region 231. In this way, the visual scene effect of the image layer 24 is more three-dimensional and better, and further the pleasing experience of using the scene lamp 20 by users is improved.

In order to reduce cross-fading influence between output illumination light and output scene light and further improve an illumination effect and a visual scene effect, in the embodiment, the scene lamp 20 further includes a light shielding plate 25, and the light shielding plate 25 separates the light output cover 23 into the main illumination region 231 and the scene light region 232, so as to at least partially separate light output from the main illumination region 231 from light output from the scene light region 232. Specifically, in the embodiment, the light shielding plate 25 is arranged on an outer surface of the light output cover 23 away from the light sources 22, and the image layer 24 is arranged on an outer surface of the scene light region 232 away from the light sources 22. Further, in the embodiment, the light shielding plate 25 is an annular plate, the annular plate is one of a circular ring plate, a polygonal ring plate, a rectangular ring plate, etc., and the light shielding plate 25 extends in the main light output direction of the main illumination region 231. The light shielding plate 25 is convexly arranged on the outer surface of the light output cover 23 in the main light output direction of the main illumination region 231, one end of the light shielding plate 25 abuts against the main illumination region 231 and/or the scene light region 232, and the image layer 24 or the main illumination region 231 is located in an inner ring of the light shielding plate 25. Specifically, in the embodiment, the image layer 24 is located in the inner ring of the light shielding plate 25. That is, the light shielding plate 25 separates the outer surface of the light output cover 23 away from the light sources 22 into the main illumination region 231 and the scene light region 232, and the image layer 24 is located in the inner ring of the light shielding plate 25 and is arranged on the outer surface of the scene light region 232. The light shielding plate 25 has a light shielding function, and may separate the main illumination region 231 and the scene light region 232 of the light output cover 23, so as to reduce the cross-fading influence between the output illumination light and the output scene light, such that the illumination effect of the main illumination region 231 and the visual scene effect of the scene light region 232 are further improved. Meanwhile, in the embodiment, the light shielding plate 25 is convexly arranged on the outer surface of the light output cover 23 away from the light sources 22, and the image layer 24 is concavely located in the inner ring of the light shielding plate 25 and arranged on the scene light region 232. In this way, the output scene light may achieve a skylight effect, further a visual effect of the output scene light is enhanced, the visual scene effect is better, and further the pleasing experience of using the scene lamp 20 by users is improved. The light shielding plate 25 is an injection molded member or a combination of an aluminum extruded section or an extrusion molded member, and is preferably made of light-proof materials. The light shielding plate is structurally connected to the light output cover 23 through clamping or screwing so as to be mounted conveniently.

Further, in the embodiment, the image layer 24 is arranged on the outer surface of the scene light region 232 away from the light sources 22, and an outer surface of the image layer 24 away from the scene light region 232 is provided with a transparent plate 29. The transparent plate 29 may enhance a deep sense of the image layer 24, and further improve a visual depth effect of the output scene light, such that the visual scene effect is better, and further the pleasing experience of using the scene lamp by users is improved. In the embodiment, the transparent plate 29 is attached to the outer surface of the image layer 24 away from the scene light region 232, and alternatively, a spacer gap is formed between the transparent plate 29 and the outer surface of the image layer 24 away from the scene light region 232. The spacer gap may enhance a visual deep sense. In order to ensure a visual effect of light output, the transparent plate 29 is arranged in parallel with the image layer 24 in the embodiment.

Third Embodiment of Scene Lamp

Figure 5:
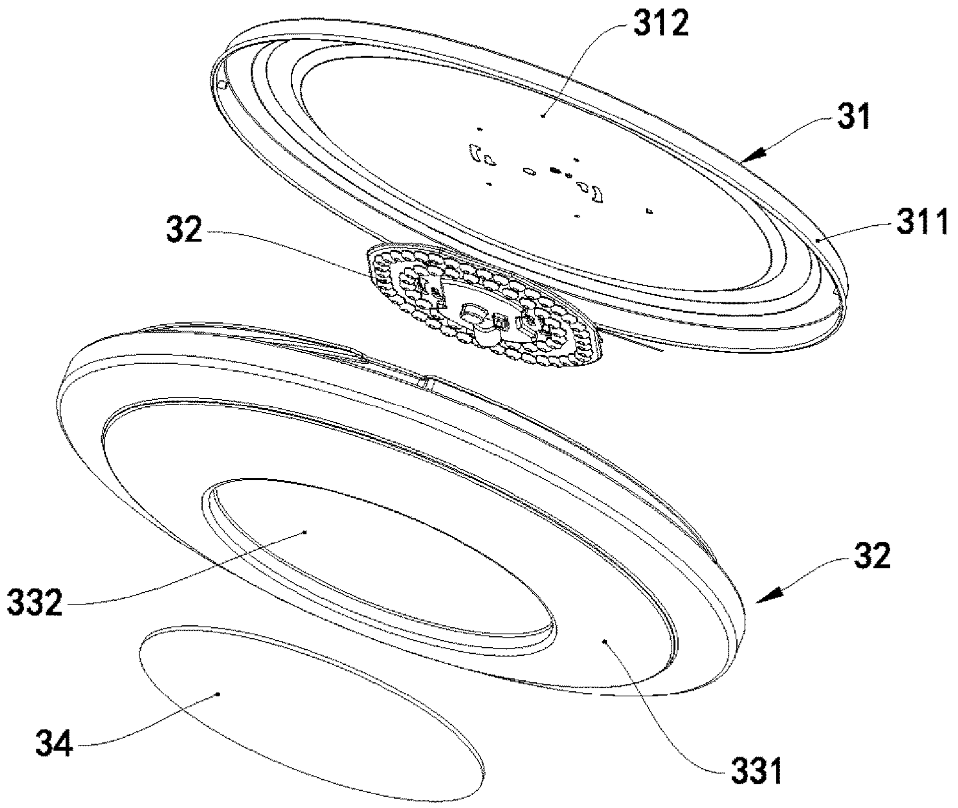
FIG. 5 is an exploded view of a structure of a third embodiment of a scene lamp of the present disclosure.
Figure 6:
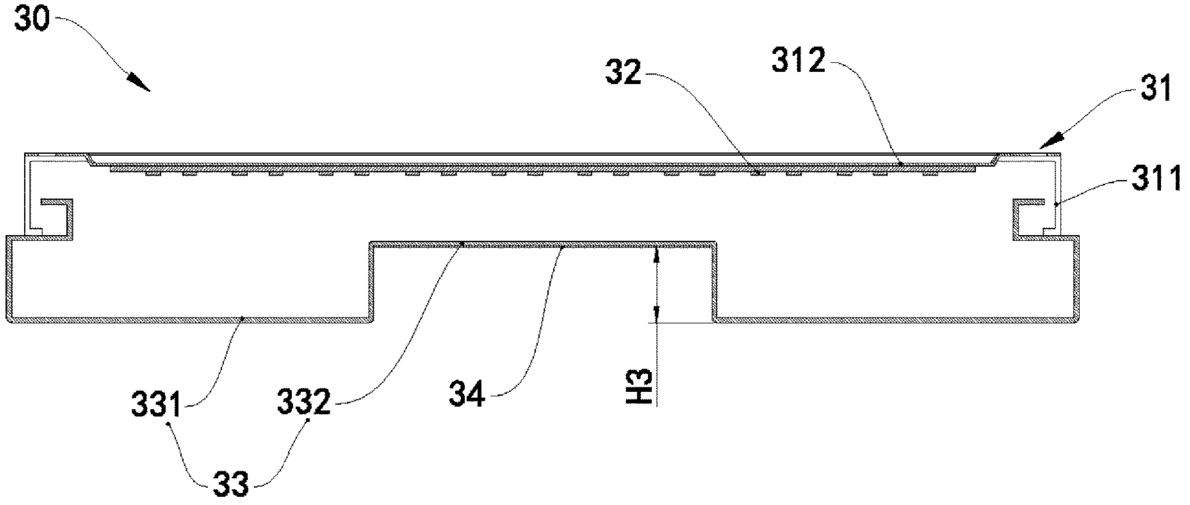
FIG. 6 is a section view of a third embodiment of a scene lamp of the present disclosure.

With reference to FIGS. 5 and 6, in the embodiment, a scene lamp 30 includes a base plate 31, a light output cover 33, and at least one group of light sources 32. The light sources 32 are arranged on the base plate 31. The light output cover 33 is connected to the base plate 31. The light output cover 33 is one or a combination of several of a diffusion cover, a light guide plate, a light transmitting cover, and a semi-light-transmitting cover. In the embodiment, the light output cover 33 has a main illumination region 331 and a scene light region 332, and the scene light region 332 is provided with an image layer 34. A height difference H3 is formed between the scene light region 332 and the main illumination region 331 in a main light output direction of the main illumination region 331. Specifically, in the embodiment, the image layer 34 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 32 of the scene lamp 30 is led out of the base plate 31 through the light output cover 33, where one part of the light is led out of the base plate 31 through the main illumination region 331 of the light output cover 33 so as to be used for illumination, and the other part of the light is led out of the base plate 31 through the scene light region 332 of the light output cover 33. The scene light region 332 is provided with the image layer 34, such that a visual effect of a virtual scene is achieved. It may be seen that in the embodiment, one light output cover 33 of the scene lamp 30 is provided with the main special illumination region 331 and the special scene light region 332, such that output illumination light and output scene light are separated, and the special scene light region 332 only occupies a local region of the light output cover 33. In this way, a visual scene effect is improved while an illumination effect is improved, and further both the illumination effect and the visual scene effect are better. Moreover, in the embodiment, the scene lamp 30 only needs to be provided with one light output cover 33, and light output from the light sources 32 is divided into two parts through the main illumination region 331 and the scene light region 332 of the light output cover 33, which are output illumination light and output scene light. In this way, multi-region light output is achieved, further the illumination effect and the visual scene effect are improved, a structure of the scene lamp 30 is simple, and the product manufacturing cost is reduced. In addition, in the embodiment, the height difference H3 is formed between the scene light region 332 having the image layer 34 and the main illumination region 331 in the main light output direction of the main illumination region 331. In this way, the visual scene effect of the image layer 34 is more three-dimensional and better, and further the pleasing experience of using the scene lamp 30 by users is improved.

Specifically, in the embodiment, the height difference H3 is formed between the scene light region 332 and the main illumination region 331 in the main light output direction of the main illumination region 331. The light output cover 33 is a light transmitting cover integrally formed, and the light output cover 33 is configured with a first region and a second region having a height difference therebetween in the main light output direction of the main illumination region 331. The main illumination region 331 is completely or partially configured in the first region, and the scene light region 332 is completely or partially configured in the second region. In this way, the light output cover 33 of the embodiment is of a three-dimensional structural integrally formed.

In the embodiment, the main illumination region 331 of the light output cover 33 is configured around a periphery of the scene light region 332. That is, the main illumination region 331 of the light output cover 33 is configured around a periphery of the image layer 34. Preferably, in the embodiment, the image layer 34 is located in a center of the light output cover 33.

Moreover, in the embodiment, the light output cover 33 is arranged opposite the light sources 32 in the main light output direction of the main illumination region 331, and a main light output direction of the light sources 32 is the main light output direction of the main illumination region 331. That is, the scene lamp 30 of the embodiment emits light vertically towards the light output cover 33.

In addition, in the embodiment, the scene lamp 30 is in a shape of a square, a circle, an ellipse, or a combination thereof. That is, the base plate 31 of the scene lamp 30 is in a shape of a square, a circle, an ellipse, or a combination thereof. By means of a mounting wall 312 of the base plate 31, the scene lamp 30 of the embodiment is mounted in a ceiling-mounted manner, an embedded manner, a wall-mounted manner, etc. In the embodiment, the mounting wall 312 of the base plate 31 is arranged opposite the light output cover 33 in the main light output direction of the main illumination region 331.

In addition, in the embodiment, the image layer 34 is attached to an outer surface of the scene light region 332 through spraying or printing; alternatively, the image layer 34 is a light transmitting film having an image, and the light transmitting film is bonded to an outer surface of the scene light region 332; and alternatively, the image layer 34 is a light transmitting membrane having an image, and the light transmitting membrane is arranged on an outer surface of the scene light region 332. Methods of the printing may include, but are not limited to, screen printing, pad printing, laser printing, UV printing, etc.

In the embodiment, the light output cover 33 is of a three-dimensional structural integrally formed, such that the height difference H3 is formed between the scene light region 332 and the main illumination region 331 in the main light output direction of the main illumination region 331, the light output cover 33 further has a joint region, and the main illumination region 331 and the scene light region 332 are connected to each other by means of the joint region. Specifically, in the main light output direction of the main illumination region 331, the scene light region 332 is configured closer to the mounting wall 312 of the base plate 31 than the main illumination region 331. That is, in the embodiment, the scene light region 332 of the light output cover 33 is concavely configured relative to the main illumination region 331 in the main light output direction of the main illumination region 331, such that the light output cover 33 of the embodiment is of a three-dimensional structural. The image layer 34 is arranged on the scene light region 332 concavely configured relative to the main illumination region 331. In this way, the output scene light may achieve a skylight effect, the visual scene effect of the image layer 34 is more three-dimensional, further a visual effect of the output scene light is enhanced, the visual scene effect is better, and further the pleasing experience of using the scene lamp by users is improved.

Fourth Embodiment of Scene Lamp

Figure 7:
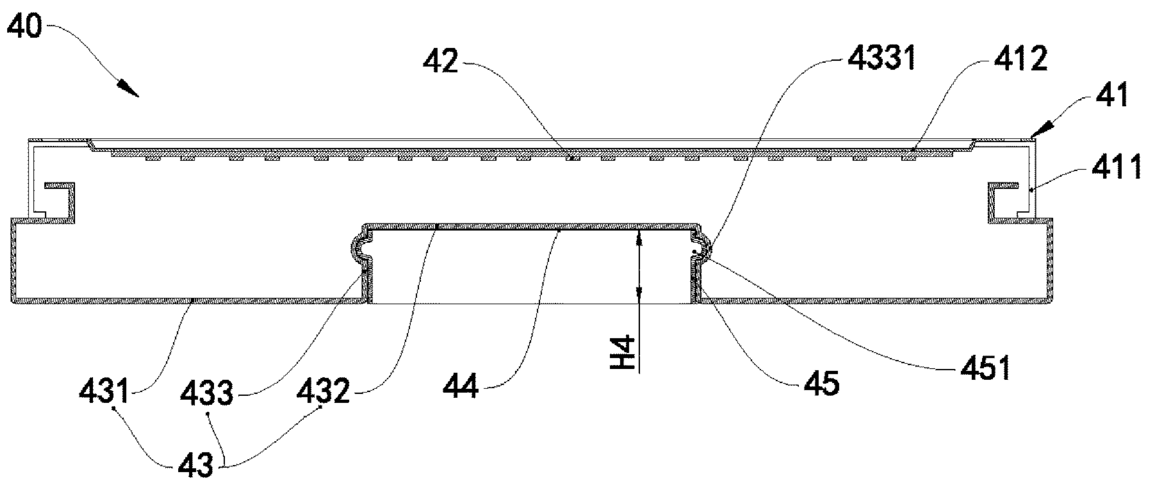
FIG. 7 is a section view of a fourth embodiment of a scene lamp of the present disclosure.

With reference to FIG. 7, in the embodiment, a scene lamp 40 includes a base plate 41, a light output cover 43, and at least one group of light sources 42. The light sources 42 are arranged on the base plate 41. The light output cover 43 is connected to the base plate 41. The light output cover 43 is one or a combination of several of a diffusion cover, a light guide plate, a light transmitting cover, and a semi-light-transmitting cover. In the embodiment, the light output cover 43 has a main illumination region 431 and a scene light region 432, and the scene light region 432 is provided with an image layer 44. A height difference H4 is formed between the scene light region 432 and the main illumination region 431 in a main light output direction of the main illumination region 431. Specifically, in the embodiment, the image layer 44 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 42 of the scene lamp 40 is led out of the base plate 41 through the light output cover 43, where one part of the light is led out of the base plate 41 through the main illumination region 431 of the light output cover 43 so as to be used for illumination, and the other part of the light is led out of the base plate 41 through the scene light region 432 of the light output cover 43. The scene light region 432 is provided with the image layer 44, such that a visual effect of a virtual scene is achieved. It may be seen that in the embodiment, one light output cover 43 of the scene lamp 40 is provided with the main special illumination region 431 and the special scene light region 432, such that output illumination light and output scene light are separated, and the special scene light region 432 only occupies a local region of the light output cover 43. In this way, a visual scene effect is improved while an illumination effect is improved, and further both the illumination effect and the visual scene effect are better. Moreover, in the embodiment, the scene lamp 40 only needs to be provided with one light output cover 43, and light output from the light sources 42 is divided into two parts through the main illumination region 431 and the scene light region 432 of the light output cover 43, which are output illumination light and output scene light. In this way, multi-region light output is achieved, further the illumination effect and the visual scene effect are improved, a structure of the scene lamp 40 is simple, and the product manufacturing cost is reduced. In addition, in the embodiment, the height difference H4 is formed between the scene light region 432 having the image layer 44 and the main illumination region 431 in the main light output direction of the main illumination region 431. In this way, the visual scene effect of the image layer 44 is more three-dimensional and better, and further the pleasing experience of using the scene lamp 40 by users is improved.

Specifically, in the embodiment, the height difference H4 is formed between the scene light region 432 and the main illumination region 431 in the main light output direction of the main illumination region 431. The light output cover 43 is a light transmitting cover integrally formed, and the light output cover 43 is configured with a first region and a second region having a height difference therebetween in the main light output direction of the main illumination region 431. The main illumination region 431 is completely or partially configured in the first region, and the scene light region 432 is completely or partially configured in the second region. In this way, the light output cover 43 of the embodiment is of a three-dimensional structural integrally formed.

In the embodiment, the main illumination region 431 of the light output cover 43 is configured around a periphery of the scene light region 432. That is, the main illumination region 431 of the light output cover 43 is configured around a periphery of the image layer 44. Preferably, in the embodiment, the image layer 44 is located in a center of the light output cover 43.

Moreover, in the embodiment, the light output cover 43 is arranged opposite the light sources 42 in the main light output direction of the main illumination region 431, and a main light output direction of the light sources 42 is the main light output direction of the main illumination region 431. That is, the scene lamp 40 of the embodiment emits light vertically towards the light output cover 43.

In addition, in the embodiment, the scene lamp 40 is in a shape of a square, a circle, an ellipse, or a combination thereof. That is, the base plate 41 of the scene lamp 40 is in a shape of a square, a circle, an ellipse, or a combination thereof. By means of a mounting wall 412 of the base plate 41, the scene lamp 40 of the embodiment is mounted in a ceiling-mounted manner, an embedded manner, a wall-mounted manner, etc. In the embodiment, the mounting wall 412 of the base plate 41 is arranged opposite the light output cover 43 in the main light output direction of the main illumination region 431.

In addition, in the embodiment, the image layer 44 is attached to an outer surface of the scene light region 432 through spraying or printing; alternatively, the image layer 44 is a light transmitting film having an image, and the light transmitting film is bonded to an outer surface of the scene light region 432; and alternatively, the image layer 44 is a light transmitting membrane having an image, and the light transmitting membrane is arranged on an outer surface of the scene light region 432. Methods of the printing may include, but are not limited to, screen printing, pad printing, laser printing, UV printing, etc.

In the embodiment, the light output cover 43 is of a three-dimensional structural integrally formed, such that the height difference H4 is formed between the scene light region 432 and the main illumination region 431 in the main light output direction of the main illumination region 431, the light output cover 43 further has a joint region, and the main illumination region 431 and the scene light region 432 are connected to each other by means of the joint region. Specifically, in the main light output direction of the main illumination region 431, the scene light region 432 is configured closer to the mounting wall 412 of the base plate 41 than the main illumination region 431. That is, in the embodiment, the scene light region 432 of the light output cover 43 is concavely configured relative to the main illumination region 431 in the main light output direction of the main illumination region 431, such that the light output cover 43 of the embodiment is of a three-dimensional structural. The image layer 44 is arranged on the scene light region 432 concavely configured relative to the main illumination region 431. In this way, the output scene light may achieve a skylight effect, the visual scene effect of the image layer 44 is more three-dimensional, further a visual effect of the output scene light is enhanced, the visual scene effect is better, and further the pleasing experience of using the scene lamp 40 by users is improved.

In order to reduce cross-fading influence between output illumination light and output scene light and further improve an illumination effect and a visual scene effect, in the embodiment, the scene lamp 40 further includes a light shielding plate 45, and the light shielding plate 45 separates the light output cover 43 into the main illumination region 431 and the scene light region 432, so as to at least partially separate light output from the main illumination region 431 from light output from the scene light region 432. Specifically, in the embodiment, the light shielding plate 45 is arranged on an outer surface of the light output cover 43 away from the light sources 42. In the embodiment, the scene light region 432 is concavely configured relative to the main illumination region 431 in the main light output direction of the main illumination region 431, such that the light shielding plate 45 of the embodiment is arranged on a concave joint wall 433 connected between the scene light region 432 and the main illumination region 431, and further the light shielding plate 45 separates the outer surface of the light output cover 43 away from the light sources 42 into the main illumination region 431 and the scene light region 432. The image layer 44 is located on the outer surface of the scene light region 432 that is concavely configured. The light shielding plate 45 has a light shielding function, and may separate the main illumination region 431 and the scene light region 432 of the light output cover 43, so as to reduce the cross-fading influence between the output illumination light and the output scene light, such that the illumination effect of the main illumination region 431 and the visual scene effect of the scene light region 432 are further improved, and further the pleasing experience of using the scene lamp 40 by users is improved. The light shielding plate 45 is an injection molded member or a combination of an aluminum extruded section or an extrusion molded member, and is preferably made of light-proof materials. The light shielding plate is structurally connected to the light output cover 43 through clamping or screwing so as to be mounted conveniently, and the image layer 44 is fixed.

Further, in the embodiment, the light shielding plate 45 is concavely provided with a first concave part 451 facing the concave joint wall 433, the concave joint wall 433 is concavely provided with a second concave part 4331 adapted to the first concave part 451, and the first concave part 451 is embedded in the second concave part 4331. By arranging the concave parts, the visual scene effect of the image layer 44 is wider, and a visual effect of a virtual scene is more vivid.

Fifth Embodiment of Scene Lamp

Figure 8:
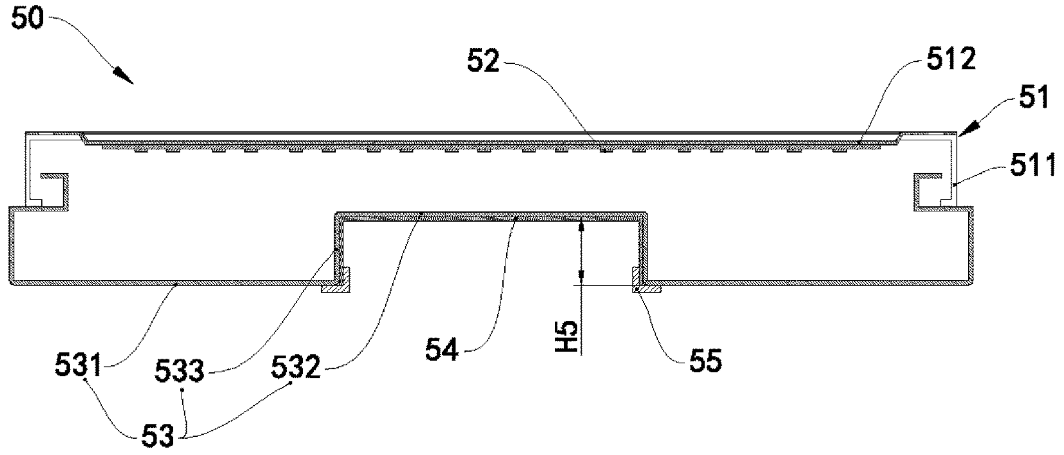
FIG. 8 is a section view of a fifth embodiment of a scene lamp of the present disclosure.

With reference to FIG. 8, in the embodiment, a scene lamp 50 includes a base plate 51, a light output cover 53, and at least one group of light sources 52. The light sources 52 are arranged on the base plate 51. The light output cover 53 is connected to the base plate 51. The light output cover 53 is one or a combination of several of a diffusion cover, a light guide plate, a light transmitting cover, and a semi-light-transmitting cover. In the embodiment, the light output cover 53 has a main illumination region 531 and a scene light region 532, and the scene light region 532 is provided with an image layer 54. A height difference H5 is formed between the scene light region 532 and the main illumination region 531 in a main light output direction of the main illumination region 531. Specifically, in the embodiment, the image layer 54 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 52 of the scene lamp 50 is led out of the base plate 51 through the light output cover 53, where one part of the light is led out of the base plate 51 through the main illumination region 531 of the light output cover 53 so as to be used for illumination, and the other part of the light is led out of the base plate 51 through the scene light region 532 of the light output cover 53. The scene light region 532 is provided with the image layer 54, such that a visual effect of a virtual scene is achieved. It may be seen that in the embodiment, one light output cover 53 of the scene lamp 50 is provided with the main special illumination region 531 and the special scene light region 532, such that output illumination light and output scene light are separated, and the special scene light region 532 only occupies a local region of the light output cover 53. In this way, a visual scene effect is improved while an illumination effect is improved, and further both the illumination effect and the visual scene effect are better. Moreover, in the embodiment, the scene lamp 50 only needs to be provided with one light output cover 53, and light output from the light sources 52 is divided into two parts through the main illumination region 531 and the scene light region 532 of the light output cover 53, which are output illumination light and output scene light. In this way, multi-region light output is achieved, further the illumination effect and the visual scene effect are improved, a structure of the scene lamp 50 is simple, and the product manufacturing cost is reduced. In addition, in the embodiment, the height difference H5 is formed between the scene light region 532 having the image layer 54 and the main illumination region 531 in the main light output direction of the main illumination region 531. In this way, the visual scene effect of the image layer 54 is more three-dimensional and better, and further the pleasing experience of using the scene lamp 50 by users is improved.

Specifically, in the embodiment, the height difference H5 is formed between the scene light region 532 and the main illumination region 531 in the main light output direction of the main illumination region 531. The light output cover 53 is a light transmitting cover integrally formed, and the light output cover 53 is configured with a first region and a second region having a height difference therebetween in the main light output direction of the main illumination region 531. The main illumination region 531 is completely or partially configured in the first region, and the scene light region 532 is completely or partially configured in the second region. In this way, the light output cover 53 of the embodiment is of a three-dimensional structural integrally formed.

In the embodiment, the main illumination region 531 of the light output cover 53 is configured around a periphery of the scene light region 532. That is, the main illumination region 531 of the light output cover 53 is configured around a periphery of the image layer 54. Preferably, in the embodiment, the image layer 54 is located in a center of the light output cover 53.

Moreover, in the embodiment, the light output cover 53 is arranged opposite the light sources 52 in the main light output direction of the main illumination region 531, and a main light output direction of the light sources 52 is the main light output direction of the main illumination region 531. That is, the scene lamp 50 of the embodiment emits light vertically towards the light output cover 53.

In addition, in the embodiment, the scene lamp 50 is in a shape of a square, a circle, an ellipse, or a combination thereof. That is, the base plate 51 of the scene lamp 50 is in a shape of a square, a circle, an ellipse, or a combination thereof. By means of a mounting wall 512 of the base plate 51 and the side wall 511, the scene lamp 50 of the embodiment is mounted in a ceiling-mounted manner, an embedded manner, a wall-mounted manner, etc. In the embodiment, the mounting wall 512 of the base plate 51 is arranged opposite the light output cover 53 in the main light output direction of the main illumination region 531.

In addition, in the embodiment, the image layer 54 is attached to an outer surface of the scene light region 532 through spraying or printing; alternatively, the image layer 54 is a light transmitting film having an image, and the light transmitting film is bonded to an outer surface of the scene light region 532; and alternatively, the image layer 54 is a light transmitting membrane having an image, and the light transmitting membrane is arranged on an outer surface of the scene light region 532. Methods of the printing may include, but are not limited to, screen printing, pad printing, laser printing, UV printing, etc.

In the embodiment, the light output cover 53 is of a three-dimensional structural integrally formed, such that the height difference H5 is formed between the scene light region 532 and the main illumination region 531 in the main light output direction of the main illumination region 531, the light output cover 53 further has a joint region, and the main illumination region 531 and the scene light region 532 are connected to each other by means of the joint region. Specifically, in the main light output direction of the main illumination region 531, the scene light region 532 is configured closer to the mounting wall 512 of the base plate 51 than the main illumination region 531. That is, in the embodiment, the scene light region 532 of the light output cover 53 is concavely configured relative to the main illumination region 531 in the main light output direction of the main illumination region 531, such that the light output cover 53 of the embodiment is of a three-dimensional structural. The image layer 54 is arranged on the scene light region 532 concavely configured relative to the main illumination region 531. In this way, the output scene light may achieve a skylight effect, the visual scene effect of the image layer 54 is more three-dimensional, further a visual effect of the output scene light is enhanced, the visual scene effect is better, and further the pleasing experience of using the scene lamp 50 by users is improved.

In the embodiment, the image layer 54 is arranged on an outer surface of the scene light region 532 away from the light sources 52, and the scene light region 532 of the light output cover 53 is concavely configured relative to the main illumination region 531 in the main light output direction of the main illumination region 531. In order to expand a visual scene range of the image layer 54, in the embodiment, the image layer 54 extends to a concave joint wall 533 connected between the scene light region 532 and the main illumination region 531.

In order to reduce cross-fading influence between output illumination light and output scene light and further improve an illumination effect and a visual scene effect, in the embodiment, the image layer 54 is arranged on an outer surface of the scene light region 532 away from the light sources 52, such that a first light blocking plate 55 is arranged at a joint between the main illumination region 531 and the scene light region 532 in the embodiment. A first end of the first light blocking plate 55 extends to and covers an outer surface of an edge of the image layer 54 adjacent to the main illumination region 531, and a second end of the first light blocking plate 55 extends to and covers an outer surface of an edge of the main illumination region 531 adjacent to the image layer 54. The light shielding plate 55 has a light shielding function, and may separate the output illumination light and the output scene light, so as to reduce the cross-fading influence between the output illumination light and the output scene light, such that the illumination effect of the main illumination region 531 and the visual scene effect of the scene light region 532 are further improved, and further the pleasing experience of using the scene lamp 50 by users is improved. Meanwhile, the image layer 54 is fixed.

Sixth Embodiment of Scene Lamp

Figure 9:
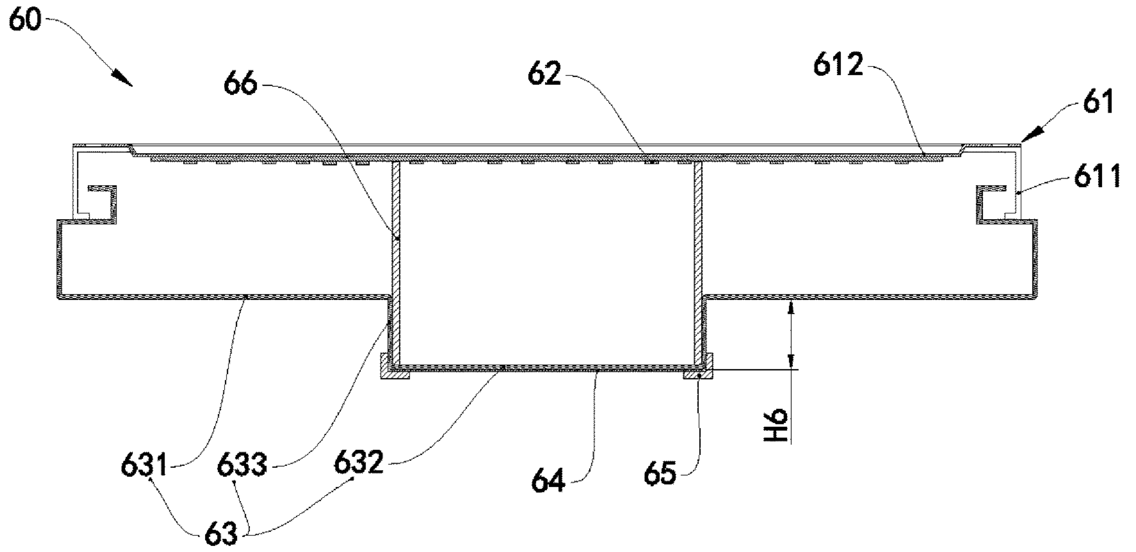
FIG. 9 is a section view of a sixth embodiment of a scene lamp of the present disclosure.

With reference to FIG. 9, in the embodiment, a scene lamp 60 includes a base plate 61, a light output cover 63, and at least one group of light sources 62. The light sources 62 are arranged on the base plate 61. The light output cover 63 is connected to the base plate 61. The light output cover 63 is one or a combination of several of a diffusion cover, a light guide plate, a light transmitting cover, and a semi-light-transmitting cover. In the embodiment, the light output cover 63 has a main illumination region 631 and a scene light region 632, and the scene light region 632 is provided with an image layer 64. A height difference H6 is formed between the scene light region 632 and the main illumination region 631 in a main light output direction of the main illumination region 631. Specifically, in the embodiment, the image layer 64 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 62 of the scene lamp 60 is led out of the base plate 61 through the light output cover 63, where one part of the light is led out of the base plate 61 through the main illumination region 631 of the light output cover 63 so as to be used for illumination, and the other part of the light is led out of the base plate 61 through the scene light region 632 of the light output cover 63. The scene light region 632 is provided with the image layer 64, such that a visual effect of a virtual scene is achieved. It may be seen that in the embodiment, one light output cover 63 of the scene lamp 60 is provided with the main special illumination region 631 and the special scene light region 632, such that output illumination light and output scene light are separated, and the special scene light region 632 only occupies a local region of the light output cover 63. In this way, a visual scene effect is improved while an illumination effect is improved, and further both the illumination effect and the visual scene effect are better. Moreover, in the embodiment, the scene lamp 60 only needs to be provided with one light output cover 63, and light output from the light sources 62 is divided into two parts through the main illumination region 631 and the scene light region 632 of the light output cover 63, which are output illumination light and output scene light. In this way, multi-region light output is achieved, further the illumination effect and the visual scene effect are improved, a structure of the scene lamp 60 is simple, and the product manufacturing cost is reduced. In addition, in the embodiment, the height difference H6 is formed between the scene light region 632 having the image layer 64 and the main illumination region 631 in the main light output direction of the main illumination region 631. In this way, the visual scene effect of the image layer 64 is more three-dimensional and better, and further the pleasing experience of using the scene lamp 60 by users is improved.

Specifically, in the embodiment, the height difference H6 is formed between the scene light region 632 and the main illumination region 631 in the main light output direction of the main illumination region 631. The light output cover 63 is a light transmitting cover integrally formed, and the light output cover 63 is configured with a first region and a second region having a height difference therebetween in the main light output direction of the main illumination region 631. The main illumination region 631 is completely or partially configured in the first region, and the scene light region 632 is completely or partially configured in the second region. In this way, the light output cover 63 of the embodiment is of a three-dimensional structural integrally formed.

In the embodiment, the main illumination region 631 of the light output cover 63 is configured around a periphery of the scene light region 632. That is, the main illumination region 631 of the light output cover 63 is configured around a periphery of the image layer 64. Preferably, in the embodiment, the image layer 64 is located in a center of the light output cover 63.

Moreover, in the embodiment, the light output cover 63 is arranged opposite the light sources 62 in the main light output direction of the main illumination region 631, and a main light output direction of the light sources 62 is the main light output direction of the main illumination region 631. That is, the scene lamp 60 of the embodiment emits light vertically towards the light output cover 63.

In addition, in the embodiment, the scene lamp 60 is in a shape of a square, a circle, an ellipse, or a combination thereof. That is, the base plate 61 of the scene lamp 60 is in a shape of a square, a circle, an ellipse, or a combination thereof. By means of a mounting wall 612 of the base plate 61, the scene lamp 60 of the embodiment is mounted in a ceiling-mounted manner, an embedded manner, a wall-mounted manner, etc. In the embodiment, the mounting wall 612 of the base plate 61 is arranged opposite the light output cover 63 in the main light output direction of the main illumination region 631.

In addition, in the embodiment, the image layer 64 is attached to an outer surface of the scene light region 632 through spraying or printing; or the image layer 64 is a light transmitting film having an image, and the light transmitting film is bonded to an outer surface of the scene light region 632; or the image layer 64 is a light transmitting membrane having an image, and the light transmitting membrane is arranged on an outer surface of the scene light region 632. Methods of the printing may include, but are not limited to, screen printing, pad printing, laser printing, UV printing, etc.

In the embodiment, the light output cover 63 is of a three-dimensional structural integrally formed, such that the height difference H6 is formed between the scene light region 632 and the main illumination region 631 in the main light output direction of the main illumination region 631, the light output cover 63 further has a joint region, and the main illumination region 631 and the scene light region 632 are connected to each other by means of the joint region. Specifically, in the main light output direction of the main illumination region 631, the main illumination region 631 is configured closer to the mounting wall 612 of the base plate 61 than the scene light region 632. That is, in the embodiment, the scene light region 632 of the light output cover 63 is convexly configured relative to the main illumination region 631 in the main light output direction of the main illumination region 631, such that the light output cover 63 of the embodiment is of a three-dimensional structural. The image layer 64 is arranged on the scene light region 632 convexly configured relative to the main illumination region 631. In this way, the visual scene effect of the image layer 64 is more three-dimensional, further a visual effect of the output scene light is enhanced, the visual scene effect is better, and further the pleasing experience of using the scene lamp 60 by users is improved.

In order to reduce cross-fading influence between input and output illumination light and input and output scene light and further improve an illumination effect and a visual scene effect, in the embodiment, the scene lamp 60 further includes a light shielding plate 66, and the light shielding plate 66 separates the light output cover 63 into the main illumination region 631 and the scene light region 632, so as to at least partially separate light output from the main illumination region 631 from light output from the scene light region 632. Specifically, in the embodiment, the light output cover 63 is arranged opposite the light sources 62 in the main light output direction of the main illumination region 631, such that the light shielding plate 66 of the embodiment is located between the light output cover 63 and the light sources 62 in the main light output direction of the main illumination region 631, and an inner through hole of the light shielding plate 66 is provided corresponding to the scene light region 632. In this way, the light output cover 63 is separated into the main illumination region 631 and the scene light region 632 at a light input side of the light output cover 63, further the input illumination light and the input scene light is separated, and the cross-fading influence between the input illumination light and the input scene light is reduced. Multi-region light output of the output illumination light and the output scene light is ensured, such that the illumination effect of the main illumination region 631 and the visual scene effect of the scene light region 632 are further improved, and further the pleasing experience of using the scene lamp 60 by users is improved. Further, in the embodiment, the scene light region 632 is convexly configured relative to the main illumination region 631 in the main light output direction of the main illumination region 631, and further one end of the light shielding plate 66 of the embodiment in the main light output direction of the main illumination region 631 extends to a convex joint wall 633 connected between the scene light region 632 and the main illumination region 631, such that it is ensured that the light output cover 63 is separated into the main illumination region 631 and the scene light region 632 at the light input side of the light output cover 63. The light shielding plate 66 is an injection molded member or a combination of an aluminum extruded section or an extrusion molded member, and is preferably made of light-proof materials. The light shielding plate is structurally connected to the light output cover 63 through clamping or screwing so as to be mounted conveniently.

In order to further reduce cross-fading influence between output illumination light and output scene light and further improve an illumination effect and a visual scene effect, in the embodiment, the image layer 64 is arranged on an outer surface of the scene light region 632 away from the light sources 62, such that a first light blocking plate 65 is arranged at a joint between the main illumination region 631 and the scene light region 632 in the embodiment. A first end of the first light blocking plate 65 extends to and covers an outer surface of an edge of the image layer 64 adjacent to the main illumination region 631, and a second end of the first light blocking plate 65 extends to and covers an outer surface of an edge of the main illumination region 631 adjacent to the image layer 64. The light shielding plate 65 has a light shielding function, and may separate the output illumination light and the output scene light, so as to reduce the cross-fading influence between the output illumination light and the output scene light, such that the illumination effect of the main illumination region 631 and the visual scene effect of the scene light region 632 are further improved, and further the pleasing experience of using the scene lamp 60 by users is improved. Meanwhile, the image layer 64 is fixed.

Seventh Embodiment of Scene Lamp

Figure 10:
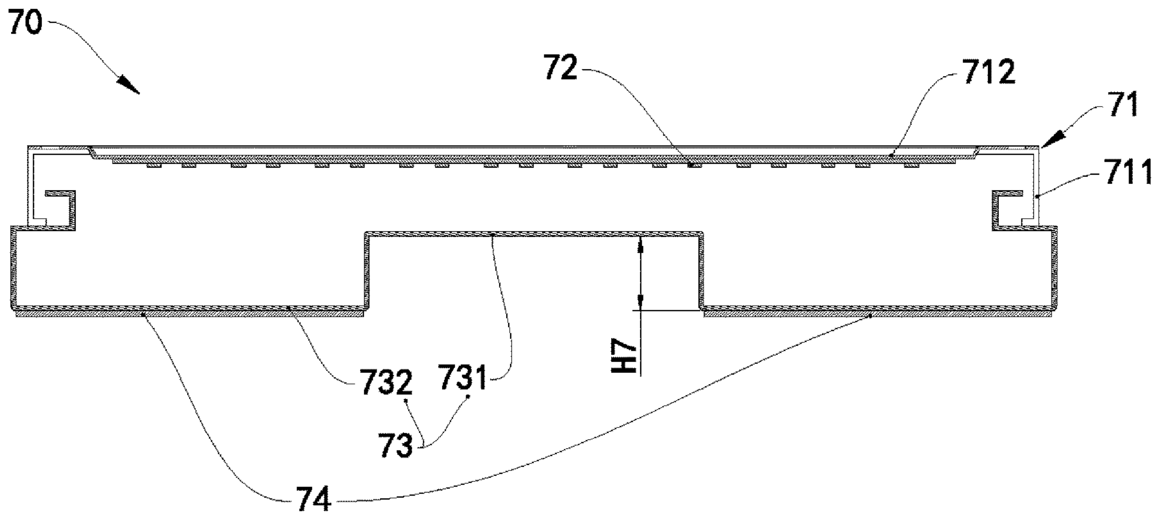
FIG. 10 is a section view of a seventh embodiment of a scene lamp of the present disclosure.

With reference to FIG. 10, in the embodiment, a scene lamp 70 includes a base plate 71, a light output cover 73, and at least one group of light sources 72. The light sources 72 are arranged on the base plate 71. The light output cover 73 is connected to the base plate 71. The light output cover 73 is one or a combination of several of a diffusion cover, a light guide plate, a light transmitting cover, and a semi-light-transmitting cover. In the embodiment, the light output cover 73 has a main illumination region 731 and a scene light region 732, and the scene light region 732 is provided with an image layer 74. A height difference H7 is formed between the scene light region 732 and the main illumination region 731 in a main light output direction of the main illumination region 731. Specifically, in the embodiment, the image layer 74 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 72 of the scene lamp 70 is led out of the base plate 71 through the light output cover 73, where one part of the light is led out of the base plate 71 through the main illumination region 731 of the light output cover 73 so as to be used for illumination, and the other part of the light is led out of the base plate 71 through the scene light region 732 of the light output cover 73. The scene light region 732 is provided with the image layer 74, such that a visual effect of a virtual scene is achieved. It may be seen that in the embodiment, one light output cover 73 of the scene lamp 70 is provided with the main special illumination region 731 and the special scene light region 732, such that output illumination light and output scene light are separated, and the special scene light region 732 only occupies a local region of the light output cover 73. In this way, a visual scene effect is improved while an illumination effect is improved, and further both the illumination effect and the visual scene effect are better. Moreover, in the embodiment, the scene lamp 70 only needs to be provided with one light output cover 73, and light output from one group of light sources 72 is divided into two parts through the main illumination region 731 and the scene light region 732 of the light output cover 73, which are output illumination light and output scene light. In this way, multi-region light output is achieved, further the illumination effect and the visual scene effect are improved, a structure of the scene lamp 70 is simple, and the product manufacturing cost is reduced. In addition, in the embodiment, the height difference H7 is formed between the scene light region 732 having the image layer 74 and the main illumination region 731 in the main light output direction of the main illumination region 731. In this way, the visual scene effect of the image layer 74 is more three-dimensional and better, and further the pleasing experience of using the scene lamp 70 by users is improved.

Specifically, in the embodiment, the height difference H7 is formed between the scene light region 732 and the main illumination region 731 in the main light output direction of the main illumination region 731. The light output cover 73 is a light transmitting cover integrally formed, and the light output cover 73 is configured with a first region and a second region having a height difference therebetween in the main light output direction of the main illumination region 731. The main illumination region 731 is completely or partially configured in the first region, and the scene light region 732 is completely or partially configured in the second region. In this way, the light output cover 73 of the embodiment is of a three-dimensional structural integrally formed.

In the embodiment, the scene light region 732 of the light output cover 73 is configured around a periphery of the main illumination region 731. That is, the image layer 74 of the light output cover 73 is configured around a periphery of the main illumination region 731. Preferably, in the embodiment, the main illumination region 731 is located in a center of the light output cover 73.

Moreover, in the embodiment, the light output cover 73 is arranged opposite the light sources 72 in the main light output direction of the main illumination region 731, and a main light output direction of the light sources 72 is the main light output direction of the main illumination region 731. That is, the scene lamp 70 of the embodiment emits light vertically towards the light output cover 73.

In addition, in the embodiment, the scene lamp 70 is in a shape of a square, a circle, an ellipse, or a combination thereof. That is, the base plate 71 of the scene lamp 70 is in a shape of a square, a circle, an ellipse, or a combination thereof. By means of a mounting wall 712 of the base plate 71, the scene lamp 70 of the embodiment is mounted in a ceiling-mounted manner, an embedded manner, a wall-mounted manner, etc. In the embodiment, the mounting wall 712 of the base plate 71 is arranged opposite the light output cover 73 in the main light output direction of the main illumination region 731.

In addition, in the embodiment, the image layer 74 is attached to an outer surface of the scene light region 732 through spraying or printing; alternatively, the image layer 74 is a light transmitting film having an image, and the light transmitting film is bonded to an outer surface of the scene light region 732; and alternatively, the image layer 74 is a light transmitting membrane having an image, and the light transmitting membrane is arranged on an outer surface of the scene light region 732. Methods of the printing may include, but are not limited to, screen printing, pad printing, laser printing, UV printing, etc.

In the embodiment, the light output cover is of a three-dimensional structural integrally formed, such that the height difference H7 is formed between the scene light region 732 and the main illumination region 731 in the main light output direction of the main illumination region 731, the light output cover 73 further has a joint region, and the main illumination region 731 and the scene light region 732 are connected to each other by means of the joint region. Specifically, in the main light output direction of the main illumination region 731, the main illumination region 731 is configured closer to the mounting wall 712 of the base plate 71 than the scene light region 732. That is, in the embodiment, the scene light region 732 of the light output cover 73 is convexly configured relative to the main illumination region 731 in the main light output direction of the main illumination region 731, such that the light output cover 73 of the embodiment is of a three-dimensional structural. The image layer 74 is arranged on the scene light region 732 convexly configured relative to the main illumination region 731. In this way, the visual scene effect of the image layer 74 is more three-dimensional, further a visual effect of the output scene light is enhanced, the visual scene effect is better, and further the pleasing experience of using the scene lamp 70 by users is improved.

Eighth Embodiment of Scene Lamp

Figure 11:
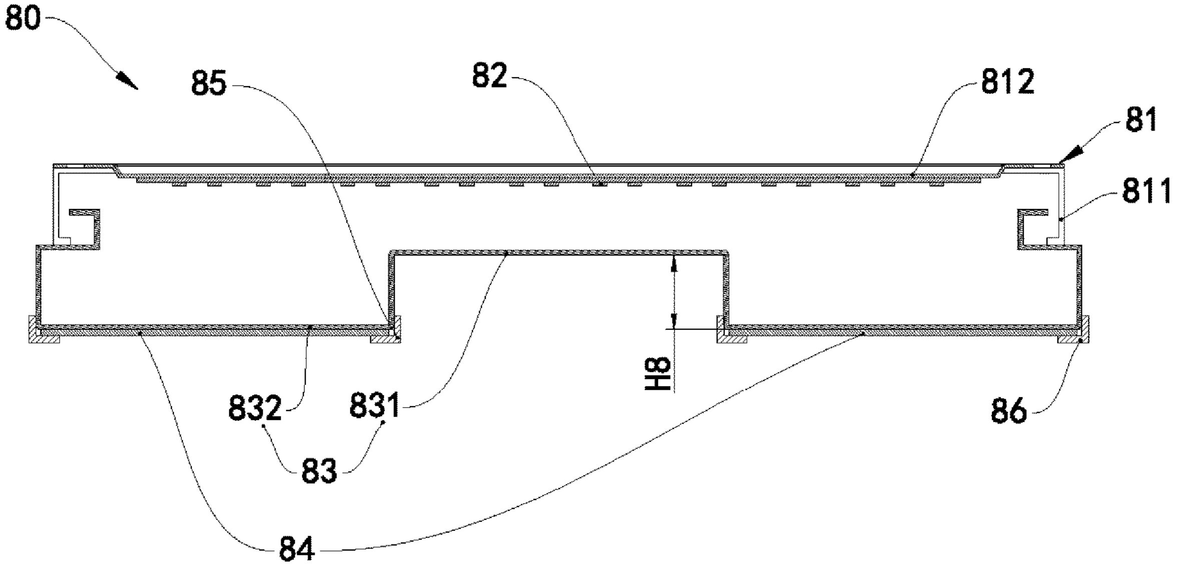
FIG. 11 is a section view of an eighth embodiment of a scene lamp of the present disclosure.

With reference to FIG. 11, in the embodiment, a scene lamp 80 includes a base plate 81, a light output cover 83, and at least one group of light sources 82. The light sources 82 are arranged on the base plate 81. The light output cover 83 is connected to the base plate 81. The light output cover 83 is one or a combination of several of a diffusion cover, a light guide plate, a light transmitting cover, and a semi-light-transmitting cover. In the embodiment, the light output cover 83 has a main illumination region 831 and a scene light region 832, and the scene light region 832 is provided with an image layer 84. A height difference H8 is formed between the scene light region 832 and the main illumination region 831 in a main light output direction of the main illumination region 831. Specifically, in the embodiment, the image layer 84 is any natural or artificial scene image, or a color combined pattern, which includes, but is not limited to, one or a combination of several of an image having a virtual sky scene, an image having landscapes, portraits of people, images of animals and plants, etc. The image having a virtual sky scene may include an image having one or a combination of several of sky scenes such as blue sky, white clouds, sunrise, sunset, sun, moon, and stars.

In the embodiment, light from the light sources 82 of the scene lamp 80 is led out of the base plate 81 through the light output cover 83, where one part of the light is led out of the base plate 81 through the main illumination region 831 of the light output cover 83 so as to be used for illumination, and the other part of the light is led out of the base plate 81 through the scene light region 832 of the light output cover 83. The scene light region 832 is provided with the image layer 84, such that a visual effect of a virtual scene is achieved. It may be seen that in the embodiment, one light output cover 83 of the scene lamp 80 is provided with the main special illumination region 831 and the special scene light region 832, such that output illumination light and output scene light are separated, and the special scene light region 832 only occupies a local region of the light output cover 83. In this way, a visual scene effect is improved while an illumination effect is improved, and further both the illumination effect and the visual scene effect are better. Moreover, in the embodiment, the scene lamp 80 only needs to be provided with one light output cover 83, and light output from one group of light sources 82 is divided into two parts through the main illumination region 831 and the scene light region 832 of the light output cover 83, which are output illumination light and output scene light. In this way, multi-region light output is achieved, further the illumination effect and the visual scene effect are improved, a structure of the scene lamp 80 is simple, and the product manufacturing cost is reduced. In addition, in the embodiment, the height difference H8 is formed between the scene light region 832 having the image layer 84 and the main illumination region 831 in the main light output direction of the main illumination region 831. In this way, the visual scene effect of the image layer 84 is more three-dimensional and better, and further the pleasing experience of using the scene lamp 80 by users is improved.

Specifically, in the embodiment, the height difference H8 is formed between the scene light region 832 and the main illumination region 831 in the main light output direction of the main illumination region 831. The light output cover 83 is a light transmitting cover integrally formed, and the light output cover 83 is configured with a first region and a second region having a height difference therebetween in the main light output direction of the main illumination region 831. The main illumination region 831 is completely or partially configured in the first region, and the scene light region 832 is completely or partially configured in the second region. In this way, the light output cover 83 of the embodiment is of a three-dimensional structural integrally formed.

In the embodiment, the scene light region 832 of the light output cover 83 is configured around a periphery of the main illumination region 831. That is, the image layer 84 of the light output cover 83 is configured around a periphery of the main illumination region 831. Preferably, in the embodiment, the main illumination region 831 is located in a center of the light output cover 83.

Moreover, in the embodiment, the light output cover 83 is arranged opposite the light sources 82 in the main light output direction of the main illumination region 831, and a main light output direction of the light sources 82 is the main light output direction of the main illumination region 831. That is, the scene lamp 80 of the embodiment emits light vertically towards the light output cover 83.

In addition, in the embodiment, the scene lamp 80 is in a shape of a square, a circle, an ellipse, or a combination thereof. That is, the base plate 81 of the scene lamp 80 is in a shape of a square, a circle, an ellipse, or a combination thereof. By means of a mounting wall 812 of the base plate 81, the scene lamp 80 of the embodiment is mounted in a ceiling-mounted manner, an embedded manner, a wall-mounted manner, etc. In the embodiment, the mounting wall 812 of the base plate 81 is arranged opposite the light output cover 83 in the main light output direction of the main illumination region 831.

In addition, in the embodiment, the image layer 84 is attached to an outer surface of the scene light region 832 through spraying or printing; or the image layer 84 is a light transmitting film having an image, and the light transmitting film is bonded to an outer surface of the scene light region 832; or the image layer 84 is a light transmitting membrane having an image, and the light transmitting membrane is arranged on an outer surface of the scene light region 832. Methods of the printing may include, but are not limited to, screen printing, pad printing, laser printing, UV printing, etc.

In the embodiment, the light output cover 83 is of a three-dimensional structural integrally formed, such that the height difference H8 is formed between the scene light region 832 and the main illumination region 831 in the main light output direction of the main illumination region 831, the light output cover 83 further has a joint region, and the main illumination region 831 and the scene light region 832 are connected to each other by means of the joint region. Specifically, in the main light output direction of the main illumination region 831, the main illumination region 831 is configured closer to the mounting wall 812 of the base plate 81 than the scene light region 832. That is, in the embodiment, the scene light region 832 of the light output cover 83 is convexly configured relative to the main illumination region 831 in the main light output direction of the main illumination region 831, such that the light output cover 83 of the embodiment is of a three-dimensional structural. The image layer 84 is arranged on the scene light region 832 convexly configured relative to the main illumination region 831. In this way, the visual scene effect of the image layer 84 is more three-dimensional, further a visual effect of the output scene light is enhanced, the visual scene effect is better, and further the pleasing experience of using the scene lamp 80 by users is improved.

In order to reduce cross-fading influence between output illumination light and output scene light and further improve an illumination effect and a visual scene effect, in the embodiment, the image layer 84 is arranged on an outer surface of the scene light region 832 away from the light sources 82, such that a first light blocking plate 85 is arranged at a joint between the main illumination region 831 and the scene light region 832 in the embodiment. A first end of the first light blocking plate 85 extends to and covers an outer surface of an edge of the image layer 84 adjacent to the main illumination region 831, and a second end of the first light blocking plate 85 extends to and covers an outer surface of an edge of the main illumination region 831 adjacent to the image layer 84. The light shielding plate 85 has a light shielding function, and may separate the output illumination light and the output scene light, so as to reduce the cross-fading influence between the output illumination light and the output scene light, such that the illumination effect of the main illumination region 831 and the visual scene effect of the scene light region 832 are further improved, and further the pleasing experience of using the scene lamp 80 by users is improved.

In the embodiment, the scene light region 832 is configured around the periphery of the main illumination region 831, in order to ensure the visual effect of the output scene light, an outer edge of the scene light region 832 away from the main illumination region 831 is provided with a second light blocking plate 86 in the embodiment. A first end of the second light blocking plate 86 extends to and covers an outer surface of an outer edge of the image layer 84 away from the main illumination region 831, and a second end of the second light blocking plate 86 extends to and covers an outer surface of a non-scene light region of the light output cover 83. Meanwhile, the second light blocking plate 86 also fixes the image layer 84.

The above embodiments are merely preferred embodiments of the present disclosure, and are not intended to limit the implementation scope of the present disclosure. Therefore, all equivalent changes or modifications made according to structures, features and principles within the application scope of the present disclosure shall be included in the application scope of the present disclosure.

What is claimed is:

1. A scene lamp, comprising a base plate, a light output cover, and at least one group of light sources, wherein the light sources are arranged on the base plate, and the light output cover is connected to the base plate, the base plate comprises a side wall;

the light output cover has a main illumination region and a scene light region, and the scene light region is provided with an image layer;

a height difference is formed between the scene light region and the main illumination region, and/or between the scene light region and the side wall region in a main output direction of the main illumination region;

the scene lamp comprises at least one of a light shielding plate, a first light blocking plate and a second light blocking plate, wherein the light shielding plate separates the light output cover into the main illumination region and the scene light region, so as to at least partially separate light output from the main illumination region from light output from the scene light region;

the first light blocking plate is arranged at a joint between the main illumination region and the scene light region;

an outer edge of the scene light region away from the main illumination region is provided with the second light blocking plate.

2. The scene lamp according to claim 1, wherein the main illumination region is configured around a periphery of the scene light region; or the scene light region is configured around a periphery of the main illumination region; or the main illumination region is located at one side of the scene light region in a direction perpendicular to the main light output direction of the main illumination region.

3. The scene lamp according to claim 1, wherein the height difference is formed between the scene light region and the side wall in the main light output direction of the main illumination region, the light output cover is a light transmitting cover integrally formed, the light output cover is a planar cover body, and the main illumination region and the scene light region are configured in different regions of the same plane of the planar cover body separately.

4. The scene lamp according to claim 1, wherein the height difference is formed between the scene light region and the main illumination region in the main light output direction of the main illumination region, the light output cover further has a joint region, and the main illumination region and the scene light region are connected to each other by means of the joint region.

5. The scene lamp according to claim 4, wherein in the main light output direction of the main illumination region, the scene light region is configured closer to a mounting wall of the base plate than the main illumination region; or in the main light output direction of the main illumination region, the main illumination region is configured closer to a mounting wall of the base plate than the scene light region.

6. The scene lamp according to claim 1, wherein the image layer is arranged on an outer surface of the scene light region away from the light sources, and an outer surface of the image layer away from the scene light region is provided with a transparent plate.

7. The scene lamp according to claim 6, wherein the transparent plate is attached to the outer surface of the image layer away from the scene light region, or a spacer gap is formed between the transparent plate and the outer surface of the image layer away from the scene light region; and/or, the transparent plate is arranged in parallel with the image layer.

8. The scene lamp according to claim 1, wherein the light output cover is arranged opposite the light sources in the main light output direction of the main illumination region, and a main light output direction of the light sources is the main light output direction of the main illumination region; or the light sources are arranged on a peripheral side of the light output cover, and a main light output direction of the light sources is perpendicular to the main light output direction of the main illumination region.

9. The scene lamp according to claim 1, wherein the image layer is attached to the scene light region through spraying or printing; or the image layer is a light transmitting film having an image, and the light transmitting film is bonded to the scene light region; or the image layer is a light transmitting membrane having an image, and the light transmitting membrane is arranged on the scene light region.

10. The scene lamp according to claim 1, wherein the image layer is arranged on an outer surface of the scene light region away from the light sources, the scene light region is concavely configured relative to the main illumination region in the main light output direction of the main illumination region, and the image layer extends to a concave joint wall connected between the scene light region and the main illumination region.

11. The scene lamp according to claim 1, wherein the light shielding plate is arranged on an outer surface of the light output cover away from the light sources, and the image layer is arranged on the outer surface of the scene light region away from the light sources.

12. The scene lamp according to claim 11, wherein the scene light region is concavely configured relative to the main illumination region in the main light output direction of the main illumination region, and the light shielding plate is arranged on the concave joint wall connected between the scene light region and the main illumination region.

13. The scene lamp according to claim 12, wherein the light shielding plate is concavely provided with a first concave part facing the concave joint wall, the concave joint wall is concavely provided with a second concave part adapted to the first concave part, and the first concave part is embedded in the second concave part.

14. The scene lamp according to claim 12, wherein the light shielding plate is an annular plate, the light shielding plate extends in the main light output direction of the main illumination region, and the image layer is located in an inner ring of the light shielding plate.

15. The scene lamp according to claim 11, wherein the height difference is formed between the scene light region and the side wall in the main light output direction of the main illumination region, the light output cover is the light transmitting cover integrally formed, the light output cover is the planar cover body, and the main illumination region and the scene light region are configured in different regions of the same plane of the planar cover body separately; and the light shielding plate is an annular plate and is convexly arranged on the outer surface of the light output cover in the main light output direction of the main illumination region, one end of the light shielding plate abuts against the main illumination region and/or the scene light region, and the image layer or the main illumination region is located in an inner ring of the light shielding plate.

16. The scene lamp according to claim 1, wherein the light output cover is arranged opposite the light sources in the main light output direction of the main illumination region, and the light shielding plate is located between the light output cover and the light sources in the main light output direction of the main illumination region.

17. The scene lamp according to claim 16, wherein the scene light region is convexly configured relative to the main illumination region in the main light output direction of the main illumination region, and one end of the light shielding plate in the main light output direction of the main illumination region extends to a convex joint wall connected between the scene light region and the main illumination region.

18. The scene lamp according to claim 1, wherein two groups of the light sources are provided, one group of the light sources are arranged opposite the main illumination region in the main light output direction of the main illumination region, and the other group of the light sources are arranged opposite the scene light region in the main light output direction of the main illumination region; or one group of the light sources are provided, and the one group of the light sources cover and irradiate the main illumination region and the scene light region.

19. The scene lamp according to claim 1, wherein the image layer is arranged on the outer surface of the scene light region away from the light sources, a first light blocking plate is arranged at a joint between the main illumination region and the scene light region, a first end of the first light blocking plate extends to and covers an outer surface of an edge of the image layer adjacent to the main illumination region, and a second end of the first light blocking plate extends to and covers an outer surface of an edge of the main illumination region adjacent to the image layer; and/or, the scene light region is configured around the periphery of the main illumination region, an outer edge of the scene light region away from the main illumination region is provided with a second light blocking plate, a first end of the second light blocking plate extends to and covers an outer surface of an outer edge of the image layer away from the main illumination region, and a second end of the second light blocking plate extends to and covers an outer surface of a non-scene-light region of the light output cover.

* * * * *